United States Patent [19]

Dunn

[11] 4,015,105
[45] Mar. 29, 1977

[54] PANEL ELECTRICAL HEATING ELEMENT
[75] Inventor: Stanley Austin Dunn, Madison, Wis.
[73] Assignee: Bjorksten Research Laboratories, Inc., Madison, Wis.
[22] Filed: Dec. 2, 1975
[21] Appl. No.: 636,973

Related U.S. Application Data

[63] Continuation-in-part of Ser. No. 421,073, Dec. 3, 1973, Pat. No. 3,924,098, which is a continuation-in-part of Ser. No. 376,721, June 22, 1974, abandoned.

[52] U.S. Cl. .............................. 219/553; 219/345; 219/548; 252/513
[51] Int. Cl.² ..................................... H05B 3/10
[58] Field of Search .......... 219/213, 345, 528, 530, 219/540, 548, 549, 552, 553; 252/512, 513, 514, 518, 521

[56] References Cited

UNITED STATES PATENTS

| | | | |
|---|---|---|---|
| 2,855,491 | 10/1958 | Navias | 252/513 X |
| 2,924,540 | 2/1960 | D'Andrea | 252/514 X |
| 2,946,937 | 7/1960 | Herbert | 252/521 X |
| 2,950,995 | 8/1960 | Plarc et al. | 252/518 X |
| 3,377,462 | 4/1968 | Pferschy | 219/213 |
| 3,626,149 | 12/1971 | Carney et al. | 219/213 |
| 3,794,518 | 2/1974 | Howell | 252/513 X |
| 3,924,098 | 12/1975 | Dunn | 219/345 |

Primary Examiner—Volodymyr Y. Mayewsky
Attorney, Agent, or Firm—Johan Bjorksten

[57] ABSTRACT

A high proportion of inexpensive materials are utilized to provide a low-cost heating element in panel form having a resistivity of $10^{-3}$ to $10^3$ ohm-centimeters which may be operated in the ambient atmosphere as or in a wall, ceiling or floor of a heating or warming oven or a room of a human residence and which may be contacted by humans without receiving an electric shock or thermal burn.

The composition comprises iron particles or iron filings and inexpensive material such as bottle glass or such waste material as glass from re-cycled bottles.

1 Claim, 6 Drawing Figures

PANEL ELECTRICAL HEATING ELEMENT

CROSS-REFERENCES

This application is a continuation-in-part of patent application Ser. No. 421,073 filed Dec. 3, 1973, for Heating Element, Method and Composition now U.S. Pat. No. 3,924,098, issued Dec. 2, 1975 and of patent application Ser. No. 376,721 filed June 22, 1964, now abandoned and continuations thereof wherein applicant disclosed electrically conductive thermal shock-resistant metal-ceramic compounds.

FIELD

This invention relates to a heating element and more particularly a heating element having a resistivity in the intermediate range which operates under ambient conditions (in the presence of oxygen) on house current such as 100 volts or near thereto.

BACKGROUND AND PRIOR ART

Heretofore it has been known that thermal shock-withstanding ceramic bodies can be made by impregnating a porous metal matrix with a ceramic compound which has a lower melting point than the metal. The importance of wetting the metal by the ceramic has been stressed (Grubel et al. U.S. Pat. Nos. 2,671,955 and 2,672,426). Furthermore, metals have been sintered together with lower melting conductive oxides to produce resistant contact surfaces (Ruben U.S. Pat. No. 2,200,854). This last mentioned patent stresses the importance of electrical conductivity in the oxide, and limits claims to the conductive vanadium pentoxide.

Ground glass (frit) and a noble metal have been mixed and fired as a film on a dielectric base to provide a resistor (as contrasted with an electric heating element (see Place et al. U.S. Pat. No. 2,950,995)).

Clay and molydenum or molybdic oxide particles, with a resin, have been extruded and fired to provide a heating element for use in a vacuum or reducing or neutral atmosphere (Navias U.S. Pat. No. 2,855,491).

In U.S. Pat. No. 2,924,540, D'Andrea has proposed a printable composition comprising a frit and silver and palladium and resin which may be first printed on a dielectric base and then fired to provide an electrical resistor element (as opposed to an electrical heating element).

Herbert in U.S. Pat. No. 2,946,937 has proposed an electrode composition wherein a metal in the form of a fine powder is mixed with a certain dielectric composition in the form of a fine powder and fired to produce a sintered electrode. At one point he states that any metal can be used which does not react with barium titanate or melt below 1150° C. At another point he states that, "It is possible to produce electrodes by including any of the following elements in the dielectric composition, so that conductive particles are dispersed throughout the dielectric: copper, silver, gold, lead, antimony, bismuth, molybdenum, tungsten, iron, cobalt, nickel, ruthenium, rhodium, palladium, oxmium, iridium and platinum. If chromium or niobium are included in the composition then conductive oxides of these elements are formed." His second statement must be deemed to contain a clear error since iron indeed reacts with barium titanite and cannot be considered an equivalent of other metals included in the list which do not so react.

OBJECTS OF THE INVENTION

A principal object is to utilize waste or re-cycled materials to provide a heating element.

Another object is a low-cost panel heating element.

Another object is a heating element which may be utilized as a wall, ceiling or floor or part of a wall, ceiling or floor of a room in a human residence.

Another object is a heating element which may be utilized as a wall, ceiling or floor or part of a wall, ceiling or floor in a warming or heating oven.

Another object is such a heating element having a resistivity of from $10^{-3}$ to $10^3$ ohm-centimeters.

Another object is such a heating element which is operable for long periods in an ambient atmosphere, that is, in the presence of oxygen and moisture.

Another object is such a heating element which may be contacted by humans without receiving an electrical shock.

Another object is such a heating element which may be operated at such temperatures that humans coming into brief contact with the element do not receive thermal burns.

Further objects will become apparent from the drawings and description which follow.

BRIEF STATEMENT OF THE INVENTION

A heating element which meets all the objectives of the invention set forth above may be made by mixing iron particles such as iron filings with finely comminuted, re-cycled bottle glass.

The desired mixture is formed into the desired shape and then fired. After firing the areas at which electrodes are to be attached are ground away sufficiently to expose the iron and electrodes are then attached in any suitable manner. Rather than being formed as a self-supporting panel, the composition may be applied as a thick layer of material to a substrate so that the layer after firing constitutes a panel.

THE DRAWINGS

Reference is made to the drawings, of which:
FIGS. 1 and 2 are enlarged cross-sectional views.
FIGS. 3, 4 and 5 are cross-sectional views.
FIG. 6 is a perspective view.

DESCRIPTION

Recycled bottle glass particles may be used in place of tailings mud for blending with iron filings or other iron particles.

The blending can be done on conventional blending equipment, such as, for example, continuous ribbon mixers such as "Day" double spiral ribbon mixers, or in sigma blade mixers, but most economically by multiple pass through differential speed rollers on a paint mill.

Subsequent drying and fusion at about 1000°–1200° C. leaves the conductive particles 2 (FIG. 1) scattered, enclosed in vitreous matrix 1, to such extent that they are protected from oxidation by atmospheric oxygen when resistance heated at normal operating temperatures for residential heating panels, say at about 70° F. to 150° F. The density and form of the suspended conductive particles are such that these frequently touch each other.

In FIG. 2 the melt has been kept three hours at 1200° C., with very slow stirring (stirrer at about five revolutions per hour) so that some coalescence or co-crystallization of the particles has taken place, augmenting thereby the contact between particles and resulting in a more feathery iron structure 3.

FIG. 3 shows an embodiment in which the matrix is very thick, for example, like a brick or a concrete block 5, or other conventional building elements and the particles have been introduced only in a layer of about a couple mils to ½ inch, so that the building elements can be assembled and then heated by electric current conducted only through the thin layer. The particles can be introduced, for example, by projecting them into the still soft mass at high velocity by spraying or centrifugal throwing, with optional subsequent application of an enamel, or a sealing coat, for example, of soluble silica or silicate solution such as sodium silicate, or colloidal silicic acid solutions.

Figure 1:
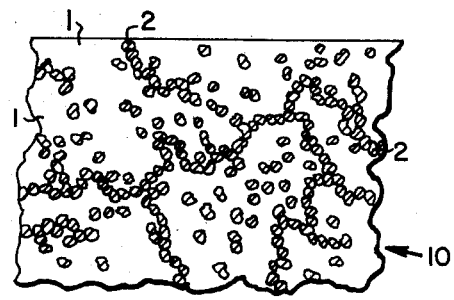
Figure 2:
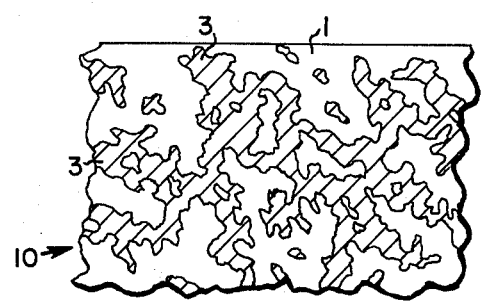
Figure 3:
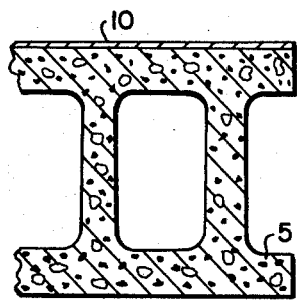
Figure 4:
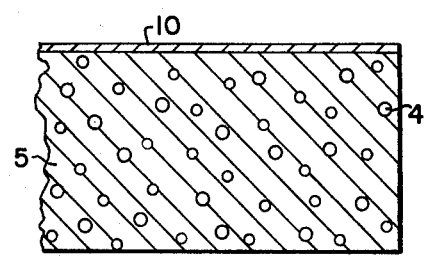
FIG. 4 shows such a building element such as a concrete block or an element in which the main body is free from metal and has been foamed, for example, by inclusion of a gas forming sulfide or carbonate in the mix as well known in the art to provide bubbles 4, the element having metal carrying conductive layer 10 applied thereto.
Figure 5:
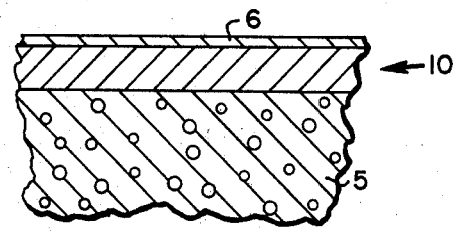
FIG. 5 is a magnified detail view, showing a surface sealing layer 6 of enamel, silicate, or the like, to close such cracks as might form and enhance the resistance of the element to oxidation. It may also serve decorative purposes.
Figure 6:
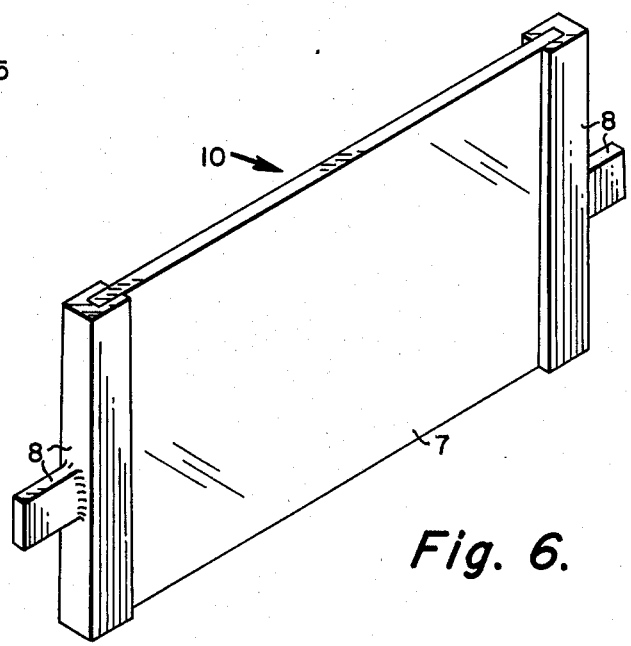

FIG. 6 shows a perspective view of a heating element 10 in panel form wherein heating surface 7 has electrodes 8 attached thereto in any of the many manners known to the art. Preferably the electrode surface is applied before any sealant coat. The surface may be first specially prepared by abrading and fusing over it a solder with appropriate flux to better bind the electrode or to provide suitable electrical contact.

EXAMPLE 1

A frit was prepared from recycled bottle glass (97% passed through a 100 mesh screen) and was mixed with 15 volume percent of iron filings. The mixed powders were ballmilled together for 10 hours. A graphite mold 6 inches long by ½ inch wide and ⅜ inch deep of U-shaped cross section was filled with the resulting mixture. The filled mold was placed in a vacuum furnace, the pressure was reduced to below 10 Torricelli and the temperature raised to 450° C. over 6 hours, then to 650° C. over 5 hours, then to 900° C. over 5 hours, then to 950° C. over 7 hours. The sample was fused over its entire length.

Surfaces near each end of a 3 inch sample bar of the product were ground down at least 1/32 inch and electrodes were firmly attached to the ground-down areas.

Temperatures were measured with thermally insulated chromel alumel thermocouples made of fine wires (0.005 inch diameter) electrically insulated from the heater bar and recorded on a chart recorder. Current through, and potential across the bar were measured to an accuracy of about ±3%. Resistivity was $10^{-3}$ ohm-centimeters.

It was concluded that the test specimen was suitable for continuous heating at temperatures of 70° F. to 150° F.

EXAMPLE 2

A frit of brown bottle glass (96% passes 100 mesh screen) and iron powder is heated by any suitable means, preferably in vacuum, to a temperature between the melting point of the matrix material and of the metal. Temperatures of about 1000° C. – 1200° C. appear suitable. Addition of some lead or alkali metal compounds in about 5 – 15% by weight would further depress the fusion temperatures by up to several hundred degrees.

Prior to the final fusion, the composition may be pressed, cut, shaped or otherwise formed to the desired physical shape.

Forming may be accomplished in a manner similar to injection molding or by extrusion or with a calendar. A preferred method is to spread the composition on a table-like flat plate with a roller, squeegee or blade.

If the end product is to be a heater, the electrodes may be applied prior the final melting so that they will be intimately contacted with the metal network formed by mutually contacting metal particles within the product. Alternatively, electrodes can be applied subsequently, for example, by applying a solder layer with approximate flux to the ends of the article, and soldering conductors to these, preferably after abrasion of the ends.

In this manner large surface heating panels can be produced at a very low cost, using recycled bottle glass which would otherwise represent a difficult disposal problem.

As pointed out above, it is possible to render only the surface of a heavy body conductive in the manner indicated and to confine the conductivity to any desired part thereof. Thus, building blocks such as tiles or concrete blocks can be made suitable for resistance heating of a wall, or even the entire inner walls, floors and ceilings of a structure. The compositions described herein can also be applied as pastes to ceramic blocks or tiles before these are "burned" in a kiln, so as to render them electrically heatable on the surface. A metal mixed mortar may be made to bridge the gap between bricks or blocks, so as to provide continuous conductivity. This may also serve as outside conductor to protect buildings from lightning.

Generally, addition to the glass frit of 4 to 30% by volume of particulate iron or steel is suitable and about 8% by volume of iron or steel filings is preferred. The resistivity is then usually about 0.1 to 25 ohm cm. but may be from $10^{-3}$ to $10^3$ ohm cm.

Leakage to ground from the surface is so low that it is undetectable by a human under conditions of 100% humidity.

Having thus described my invention, I claim:

1. An electrical heating element in the form of a laterally extended member having a resistivity of $10^{-3}$ to $10^3$ ohm centimeters, operable at a surface temperature of 70° F. to 150° F. in the presence of moisture and oxygen without substantial degradation which comprises a product of fusing from 4% to 30% by volume of finely comminuted particles consisting essentially of iron with a mixture of finely comminuted particles of recycled bottle glass, having electrodes attached to opposite portions of said laterally extended member, having from 100 to 135 volts applied across said electrodes, having a leakage to ground from the surface below that detectable by a human under conditions of 100% humidity.

* * * * *